June 25, 1940. D. R. FAGERHOLM 2,205,472
FISH LURE
Filed Feb. 10, 1939
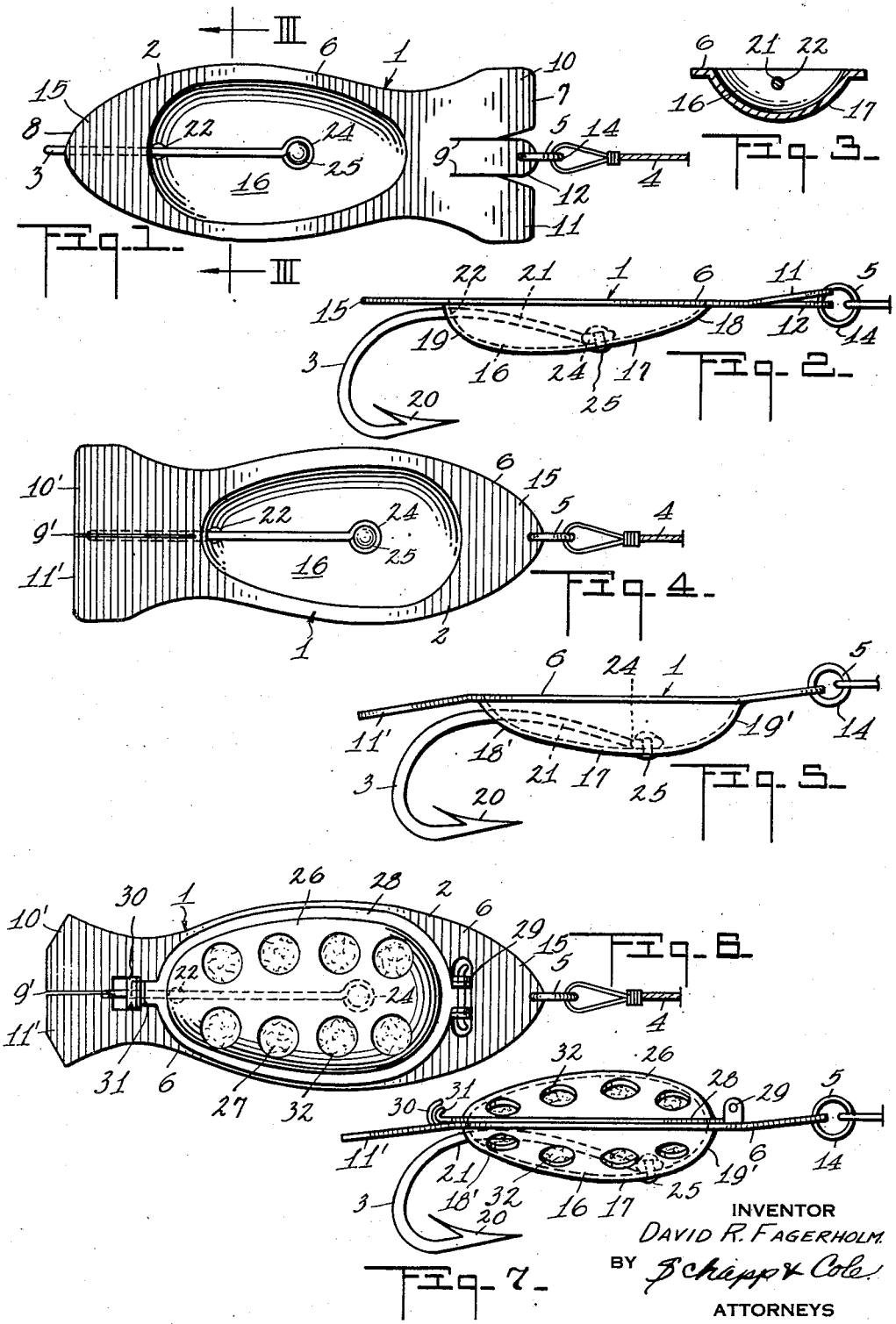
INVENTOR
DAVID R. FAGERHOLM.
BY Schapp & Cole
ATTORNEYS Patented June 25, 1940

2,205,472

UNITED STATES PATENT OFFICE 2,205,472

FISH LURE

David R. Fagerholm, San Francisco, Calif.

Application February 10, 1939, Serial No. 255,632

6 Claims. (Cl. 43—42)

The present invention relates to improvements in fish lures and has among its objects the provision of a lure which will simulate the movements of a fish as it is trolled through the water.

It is particularly proposed in this invention to provide a fish lure having adjustable fin-like sections, which may be set by the fisherman, and thus permit a desired movement of the lure to be obtained.

These fin-like sections may be manually adjusted by the fisherman from time to time so as to cope with varying conditions, such as tide currents, depth to which the lure should be trolled, the path to be followed by the lure as it is trolled, etc.

It is further proposed to provide a lure having the general outline of a fish, thus making the lure more attractive to the fish. The adjustable fin-like sections are preferably arranged on the lure in positions corresponding to those on an actual fish.

It is also proposed to provide a lure that is constructed in such a manner as to facilitate the anchoring of a hook thereto and which will correctly position the hook relative to the lure and to the trolling line.

As a further object I propose to provide a fish lure having a bait-receiving compartment formed therein, which will aid in attracting the fish thereto.

A still further object of my invention resides in the provision of a fish lure that is simple in construction, durable and efficient for the purposes intended, and which may be manufactured at relative small cost.

Other objects and advantages of my invention will appear as the specification proceeds and the novel features will be set forth in the claims hereto appended.

For a better understanding of the invention, reference should be had to the accompanying drawing, forming part of this application, in which:

Figure 1 is a top plan view of one form of my fish lure;

Figure 2, a side elevation view of the form shown in Figure 1;

Figure 3, a transverse sectional view taken along line III—III of Figure 1;

Figure 4, a top plan view of a modified form of my fish lure;

Figure 5, a side elevational view of the fish lure illustrated in Figure 4;

Figure 6, a top plan view of a further modification of my fish lure; and

Figure 7, a side elevational view of the fish lure disclosed in Figure 6.

While I have shown only the preferred forms of my invention, it should be understood that various changes or modifications may be made within the scope of the appended claims without departing from the spirit of the invention.

In carrying my invention into practice, I provide a fish lure indicated generally at 1, and including in its structural features an elongated fish-like body 2 having a hook 3 anchored thereto. A line 4 is adapted to be secured to the lure as at 5 for trolling the latter through the water.

The body 2 is preferably made from material that may be manually bent for the purpose hereinafter described. The body 2 includes a substantially flat plate 6 having the leading edge 7 thereof shaped to represent the tail fins of a fish, the trailing edge 8 being fashioned to simulate the head of a fish.

The lure illustrated in Figure 1 may be more accurately described as representing a fish swimming backwards, since the line 4 is pulled through the water.

In Figure 1, I show the plate 6 as having slits 9 extending thereinto from the marginal edge of the plate so as to define fin-like sections 10 and 11 and a central tab 12. The latter has a ring 14 engaging therewith, which forms part of the attaching means 5 previously mentioned.

These fin-like sections may be manually bent relative to the main body of the lure for causing the latter to take a predetermined course as the lure is trolled. The head-like section, which may be considered a fin, is bendable for altering the course taken by the lure. These adjustments may be made by the fisherman in order to suit his particular desires and to meet with varying conditions.

The intermediate section of the plate 6 is depressed so as to form a recess 16 in the top of the plate, which produces a correspondingly-shaped bulged portion 17 on the undersurface of the plate. The recess is substantially semi-egg-shaped, as will appear by reference to Figures 1 to 3, inclusive.

The leading part 18 of the bulged portion gradually merges into the plate 6 so as to cause an easy flow of water rearwardly thereover. The trailing part 19 of the bulged portion is somewhat more abrupt than the leading part 18 as will be seen in Figure 2.

The hook 3 has its barbed end 20 disposed below the bulged portion 17, while its shank 21 passes through an opening 22 in the wall defining the portion 17. The usual eyelet end 24 of the hook is anchored in the recess 16 by a rivet 25, or other suitable fastening means.

The form of my invention as exemplified in Figures 4 and 5 is substantially the same as that shown in the first form, except as hereinafter noted. Therefore, like numerals will be applied to corresponding parts.

In Figures 4 and 5, the position of the fish lure is reversed from that shown in Figures 1 to 3, inclusive, and the line 4 is attached to the head portion 15, the latter becoming the leading edge of the lure.

This second form of my invention shows only a single slit 9' extending into the tail part of the lure, which provides two bendable fin-like sections 10' and 11'. The abrupt part 19' of the bulged portion 17 faces the leading edge of the lure, while the part 18' faces the trailing edge thereof. A transverse sectional view through the central part of Figure 4 will be identical with Figure 3.

The main body of the lure shown in Figures 6 and 7 is substantially identical with the form shown in Figures 4 and 5 and corresponding reference numerals will be used to designate like parts. A slight difference in the tail part of the lure will be noted in Figure 6.

In this third form, a lid 26 is adapted to form a cover over the recess 16. The lid and the recess coact in forming a compartment in which suitable bait 27 may be placed. The dimensions of the lid correspond to those of the bulged portion 17. A marginal flange 28 extends around the lid and is adapted to bear against the upper surface of the plate 6.

The lid 26 is hinged to the plate 6, as at 29, and a snap catch is provided at 30 so as to engage over a curled lip 31 extending from the lid. The bulged portion 17 and the lid are provided with openings 32 for the purpose of exposing the bait. The lid may be swung on its hinge to allow the bait to be placed in the recess 16 or removed therefrom.

In all three forms of my invention, the plate 6 normally assumes a substantially horizontal position as the lure is trolled. The bulged portion 17 acts to impart a lifting effect to the lure as the latter is pulled through the water, while the fin-like section may be given the desired angular twist to cause the lure to follow a predetermined course.

The fisherman may set the fin-like sections so as to give the lure a rising effect which will compensate for the weight of a sinker placed on the line.

I claim:

1. In a fish lure, an elongated fish-shaped body having substantially flat and manually bendable fin-like sections at the leading and trailing edges thereof and a bulged portion between the fin-like sections, the trailing section having substantially the same width as the intermediate portion of said body.

2. In a fish lure, a substantially flat and elongated fish-shaped body having bendable fin-like sections at the leading and trailing edges thereof, the body having a bulged portion on one face thereof between the fin-like sections and a recess in the opposite face of the body, and a hook anchored in said recess with its shank passing through an opening in the wall of the recess to present the barbed end of the hook below the bulged portion.

3. In a fish lure, a plate having a substantially semi-egg-shaped bulged portion extending from one face thereof and a correspondingly-shaped recess in its opposite face, and a lid having substantially the same shape as the bulged portion and arranged to form a cover over the recess in complementary relation thereto and define a bait-receiving compartment, the latter having perforations formed therein.

4. In a fish lure, a strip of material having a semi-egg-shaped bulged portion on one face thereof disposed between the leading and trailing sections of the strip, the bulge occupying the major part of the strip, said bulged portion being arranged inwardly from the side edges of the strip whereby the side marginal sections of the strip define flanges extending lengthwise of the strip, and means for securing a hook to the strip.

5. In a fish lure, a strip of material having a semi-egg-shaped bulged portion on one face thereof disposed between the leading and trailing sections of the strip, the bulge occupying the major part of the strip, said bulged portion being arranged inwardly from the side edges of the strip whereby the side marginal sections of the strip define flanges extending lengthwise of the strip, and means for securing a hook to the strip, the leading section of the strip in front of said bulged portion being substantially flat so as to be bendable by hand turned upwardly at a slight angle relative to the main part of the strip.

6. In a fish lure, a strip of material having a semi-egg-shaped bulged portion on one face thereof disposed between the leading and trailing sections of the strip, the bulge occupying the major part of the strip, said bulged portion being arranged inwardly from the side edges of the strip whereby the side marginal sections of the strip define flanges extending lengthwise of the strip, and means for securing a hook to the strip, the leading and trailing sections of the strip being substantially flat so as to be bendable by hand turned in opposite directions at slight angles relative to the main part of the strip.

DAVID R. FAGERHOLM.